United States Patent Office 3,741,910
Patented June 26, 1973

3,741,910
CATALYST FOR THE PRODUCTION OF
ACRYLONITRILE
Tatsuo Shiraishi, Susumu Kishiwada, Shinkichi Shimizu, Shigeru Honmaru, Hiroshi Ichihashi, and Yoshikiko Nagaoka, Niihama, Japan, assignors to Sumitomo Chemical Company, Limited, Osaka-shi, Japan
No Drawing. Filed May 28, 1971, Ser. No. 148,166
Claims priority, application Japan, Sept. 11, 1970, 45/80,175
Int. Cl. B01j 11/82
U.S. Cl. 252—437        5 Claims

ABSTRACT OF THE DISCLOSURE

In the production of acrylonitrile by a vapor phase reaction of propylene, ammonia and oxygen at an elevated temperature, a process which comprises contacting propylene, ammonia and oxygen with a catalyst composition comprising a catalyst system of the formula:

$$Tl_aP_bMo_cFe_dBi_eMn_fX_gO_h$$

wherein X represents one or more of the metals, Ni, Mg and Co and $a, b, c, d, e, f, g$ and $h$ represent, respectively, the relative number of atoms of each component; provided that, when $c$ is 12, $a$ is 2 or less, but not 0, $b$ is 0 5; $e$ is 0.1 to 5; $f$ is not more than 15 but not 0; $g$ is 0 to 15; $f+g$ is 2 to 15; and $h$ is decided or determined depending on the number of the other atoms and is usually from 38.3 to 81.5.

---

The present invention relates to a process for producing acrylonitrile. More particularly, it relates to a process for selective production of acrylonitrile by the vapor phase reaction of propylene, ammonia and oxygen in the presence of a specific catalyst system.

For the production of acrylonitrile by ammoxidation of propylene, there have been proposed a variety of catalyst systems. Some examples of these systems are as follows: a catalyst system comprising bismuth, tin or antimony salt of molybdic acid or phosphomolybdic acid, or bismuth phosphowolframate (Japanese patent publication No. 5,870/1961); a catalyst system comprising the oxides of bolybdenum, phosphorus, bismuth and iron (Japanese patent publication No. 17,967/1963); a catalyst system comprising the oxides of copper and antimony (Japanese patent publication No. 14,093/1966); a catalyst system comprising the oxides of bismuth and tungsten (Japanese patent publication No. 27,402/1968); a catalyst system comprising the oxides of uranium and antimony (Japanese patent publication No. 24,367/1965), etc. However, some drawback are seen in these known catalyst systems.

One of the drawbacks is the production of acrylonitrile in a relatively low selectivity. Thus, there are by-produced carbon monoxide, carbon dioxide, acrolein, acetaldehyde, acetonitrile, hydrogen cyanide and the like in large amounts, which reduce the yield of acrylonitrile. Moreover, the production of these by-products results not only in the loss of the starting materials, but also in the difficult recovery of the desired acrylonitrile.

Another drawback is the low yield of acrylonitrile in each pass of propylene feed. This is probably due to the low conversion of propylene or, even if the conversion of propylene may be high, the low selectivity to acrylonitrile.

A further drawback of these known systems is the production of excessively oxidized by-products such as carbon monoxide and carbon dioxide, which makes the control of heat difficult. The side reactions are more exothermic than the main reaction, and a larger amount of a diluent is required to control the heat generating therefrom.

As a result of extensive studies, it has been found in accordance with this invention, that the use of a specific catalyst system comprising thallium in the ammoxidation of propylene will afford acrylonitrile with a high selectivity in an excellent yield per each pass. It has also been found that the use of this system suppresses considerably the formation of undesirable by-products, especially carbon monoxide and carbon dioxide, and makes it possible to carry out the reaction at a relatively low temperature. The present invention is based on these findings.

According to the present invention, the vapor phase reaction of propylene, ammonia and oxygen is carried out in the presence of a catalyst system corresponding to the formula: $Tl_aP_bMo_cFe_dBi_eMn_fX_gO_h$ wherein X represents one or more metals selected from the group consisting of Ni, Mg and Co, and $a, b, c, d, e, f, g$ and $h$ represent, respectively, the number of atoms of each component; provided that, when $c$ is 12, $a$ is 2 or less (preferably 0.01 to 1.0) but not 0; $b$ is 0.5 (preferably 0.01 to 3.0); $d$ is 0.1 to 5; $e$ is 0.1 to 5 (preferably 0.5 to 3.0); $f$ is not more than 15 (preferably not more than 12) but not 0; $g$ is 0 to 15 (preferably 0 to 12); $f+g$ is 2 to 15 (preferably 2 to 12); and $h$ is decided or determined depending on the number of the other atoms and is usually from 38.3 to 81.5 (preferably 38.9 to 69.0).

The starting materials in the ammoxidation of this invention are propylene, ammonia and oxygen. The propylene is not necessarily required to be highly pure and may contain, for instance, some amounts of low molecular weight saturated hydrocarbons such as propane. As the oxygen source, there may be used pure oxygen gas, air enhanced or not in the oxygen concentration or any other free oxygen-containing gas. From the economical viewpoint, the use of air is preferred. In order to increase the selectivity to acrylonitrile, steam may be introduced into the reaction system, but this introduction is not necessarily required. If desired, an approximate inert gas such as nitrogen, carbon dioxide, or argon may be used as a diluent.

For preparation of the catalyst system, there may be employed metallic thallium and thallium compounds (e.g. thallium nitrate, thallium carbonate, and thallium chloride), molybdenum compounds (e.g. ammonium molybdate, molybdenum oxide, molybdic acid and phosphomolybdic acid), phosphorus compounds (e.g. phosphoric acid, ammonium phosphate, and phosphorus pentoxide), iron compounds (e.g. ferric nitrate, and ferric chloride), bismuth compounds (e.g. bismuth nitrate, bismuth chloride and bismuth oxide), magnesium compounds (e.g. magnesium nitrate and magnesium chloride), cobalt compounds (e.g. cobalt nitrate and cobalt chloride), nickel compounds (e.g. nickel nitrate, and nickel chloride) and manganese compounds (e.g. manganese nitrate and manganese chloride).

The catalyst system may be used as such but it is advantageously incorporated with a suitable carrier (e.g. silica, alumina, silicon carbide, titanium oxide). The amount of the carrier is varied with its kind and may be usually less than 90% by weight, preferably from 5 to 90% by weight, of the catalyst composition. The catalyst composition is normally formed in tablets or granules on use.

The preparation of the mixed oxide catalyst composition may be executed by a per se conventional procedure. For instance, a thallium salt, an iron salt, a bismuth salt, a phosphorus compound, a manganese salt and one or more of a magnesium salt, a cobalt salt and a nickel salt are added to an aqueous solution of a molybdate such as ammonium molybdate; the resulting slurry is admixed with a carrier material and evaporated to dryness; and the resultant cake is calcined at an elevated temperature in atmosphere and, after cooling, crushed and shaped into pellets or granules.

The production of acrylonitrile using the catalyst composition of the invention may be effected by a fluidized bed process or a fixed bed process. The reaction temperature is associated with the kind of the catalyst composition and usually from about 300° to about 520° C., preferably from about 350° to about 480° C. The reaction is usually carried out at a nearly atmospheric pressure (preferably about 0.7 to about 5 atm.). The molar ratio of the starting materials may be propylene:ammonia:oxygen=1.0:0.7-2.5

(favorably 1.0-2.0):1.0-5.0 (favorably 1.5-3.5). When steam is used, it may be usually not more than about 18 mol, favorably from about 1 to about 10 mol per 1 mol of propylene. The space velocity is ordinarily from about 50 to about 2000 hr.$^{-1}$, preferably from about 100 to about 1000 hr.$^{-1}$.

By the use of the catalyst system of the present invention, the desired acrylonitrile can be produced in a high selectivity and an excellent yield per each pass with little by-production of carbon monoxide and carbon dioxide. In addition, the life of the catalytic activity is sufficiently and satisfactorily long and the thallium in the catalyst composition is never volatilized during the reaction.

A number of preferred embodiments of the present invention are shown in the following examples.

EXAMPLE 1

(A) Thallium nitrate (1.33 g.) ferric nitrate (10.10 g.), manganese nitrate (7.18 g.), magnesium nitrate (6.41 g.), cobalt nitrate (7.28 g.) and nickel nitrate (39.99 g.) are dissolved in distilled water (300 ml.) and bismuth nitrate (12.13 g.) is dissolved in dilute nitric acid (6% by weight; 25 ml.). These solutions are combined together. The resultant mixture is added to a solution of ammonium molybdate (52.98 g.) in dilute aqueous ammonia (3.5% by weight; 300 ml.) containing phosphoric acid (85% by weight; 0.23 g.). To the resultant slurry dispersion, silica sol (SiO$_2$, 20% by weight; 100 ml.) is added, and the mixture is evaporated to dryness until the generation of nitrogen dioxide is ceased. The residue is calcined at 300° C. for 3 hours (first calcination), cooled and crushed. The obtained powder is tabletted and calcined at 550° C. for 6 hours (2nd calcination) to give a catalyst composition, of which the active components correspond to the formula: Tl$_{0.2}$P$_{0.08}$Mo$_{12}$Fe$_1$Bi$_1$Mn$_1$Mg$_1$Co$_1$Ni$_{5.5}$O$_{48.0}$ (wherein the carrier is omitted).

(B) In a glass-made reaction tube of 10 mm. in inner diameter, the above-obtained catalyst composition 6 ml.) is charged and heated up to 410° C. Then, a gaseous mixture of propylene, ammonia, oxygen, steam and nitrogen (1.0:1.2:2.8:9.0:6.8 in molar ratio) is introduced into the reaction tube at a space velocity of 550 hr.$^{-1}$, whereby acrylonitrile is produced.

The conversion of propylene is 100% and the selectivities to acrylonitrile, carbon monoxide and carbon dioxide are respectively 80%, 7.0% and 6.1%, when calculated according to the following equations:

Conversion of propylene (percent)

$$=\frac{\text{Reacted propylene (mol)}}{\text{Feed propylene (mol)}} \times 100$$

Selectivity (percent)

$$=\frac{\text{Weight of carbon atoms in product}}{\text{Weight of carbon atoms in reacted propylene}} \times 100$$

EXAMPLE 2

In the same manner as in Example 1, except that cobalt nitrate and magnesium nitrate are not used, and the amounts of manganese nitrate and nickel nitrate are changed, respectively, to 28.71 g. and 32.72 g., a catalyst composition of which the active components correspond to the formula: Tl$_{0.2}$P$_{0.08}$Mo$_{12}$Fe$_1$Bi$_1$Mn$_4$Ni$_{4.5}$O$_{48.0}$ is prepared.

As in Example 1, a gaseous mixture of propylene, ammonia, oxygen, steam and nitrogen (1.0:1.1:2.9:8.7:6.3 in molar ratio) is contacted with the above-obtained catalyst composition (6 ml.) at 440° C. at a space velocity of 540 hr.$^{-1}$, whereby acrylonitrile is produced. The conversion of propylene is 96% and the selectivities to acrylonitrile, carbon monoxide and carbon dioxide are, respectively 88%, 2.0% and 2.2%.

EXAMPLE 3

In the same manner as in Example 1, except that cobalt nitrate and magnesium nitrate are not used, and the amount of nickel nitrate is changed to 54.53 g., a catalyst composition of which the active components corresponds to the formula: Tl$_{0.2}$P$_{0.08}$Mo$_{12}$Fe$_1$Bi$_1$Mn$_1$Ni$_{7.5}$O$_{48.0}$ is prepared.

As in Example 1, a gaseous mixture of propylene, ammonia, oxygen, steam and nitrogen (1.0:1.1:3.0:8.6:6.6 in molar ratio) is contacted with the above-obtained catalyst composition (6 ml.) at 410° C. at a space velocity of 550 hr.$^{-1}$, whereby acrylonitrile is produced. The conversion of propylene is 96% and the selectivities to acrylonitrile, carbon monoxide and carbon dioxide are, respectively 82%, 3.2% and 5.0%.

EXAMPLE 4

In the same manner as in Example 1, except that nickel nitrate and cobalt nitrate are not used, and the amounts of manganese nitrate and magnesium nitrate are changed, respectively to 3.59 g. and 54.49 g., a catalyst composition of which the active components correspond to the formula: Tl$_{0.2}$P$_{0.08}$Mo$_{12}$Fe$_1$Bi$_1$Mn$_{0.5}$Mg$_{8.0}$O$_{48.0}$ is prepared.

As in Example 1, a gaseous mixture of propylene, ammonia, oxygen, steam and nitrogen (1.0:1.2:2.9:4.8:6.9 in molar ratio) is contacted with the above-obtained catalyst composition (6 ml.) at 430° C. at a space velocity of 405 hr.$^{-1}$, whereby acrylonitrile is produced. The conversion of propylene is 90% and the selectivities to acrylonitrile, carbon monoxide and carbon dioxide are respectively 79%, 4.8% and 4.5%.

EXAMPLE 5

In the same manner as in Example 1, except that magnesium nitrate and nickel nitrate are not used, and the amounts of manganese nitrate and cobalt nitrate are changed, respectively, to 14.35 g. and 43.66 g., a catalyst composition of which the active components correspond to the formula: Tl$_{0.2}$P$_{0.08}$Mo$_{12}$Fe$_1$Bi$_1$Mn$_2$Co$_6$O$_{47.5}$ is prepared.

As in Example 1, a gaseous mixture of propylene, ammonia, oxygen, steam and nitrogen (1.0:1.2:3.0:8.9:6.8 in molar ratio) is contacted with the above-obtained catalyst composition (6 ml.) at 390° C. at a space velocity of 540 hr.$^{-1}$, whereby acrylonitrile is produced. The conversion of propylene is 99.6% and the selectivities to acrylonitrile, carbon monoxide and carbon dioxide are, respectively 84%, 5.6% and 5.5%.

EXAMPLE 6

In the same manner as in Example 1, except that cobalt nitrate is not used, and the amounts of manganese nitrate and magnesium nitrate are changed, respectively to 3.59 g. and 16.03 g., a catalyst of which the active components correspond to the formula:

Tl$_{0.2}$P$_{0.08}$Mo$_{12}$Fe$_1$Bi$_1$Mn$_{0.5}$Mg$_{2.5}$Ni$_{5.5}$O$_{48.0}$ is prepared.

As in Example 1, a gaseous mixture of propylene, ammonia, oxygen, steam and nitrogen (1.0:1.2:3.0:8.8:6.6 in molar ratio) is contacted with the above obtained catalyst composition (6 ml.) at 390° C. at a space velocity of 540 hr.$^{-1}$ whereby acrylonitrile is produced. The conversion of propylene is 96% and the selectivities to acrylonitrile, carbon monoxide and carbon dioxide are, respectively 87%, 1.8% and 2.9%.

EXAMPLE 7

In the same manner as in Example 1, execpt that magnesium nitrate is not used, and the amounts of manganese nitrate and cobalt nitrate are changed, respectively to 3.59 g. and 18.19 g., a catalyst composition of which the active components correspond to the formula:

$T_{4.2}P_{0.08}Mo_{12}Fe_1Bi_1Mn_{0.5}Co_{2.5}Ni_{5.5}O_{48.0}$ is prepared.

As in Example 1, a gaseous mixture of propylene, ammonia, oxygen, steam and nitrogen (1.0:1.1:2.8:8.7:6.4 in molar ratio) is contacted with the above-obtained catalyst composition (6 ml.) at 410° C. at a space velocity of 410 hr.$^{-1}$, whereby acrylonitrile is produced. The conversion of propylene is 100% and the selectivities to acrylonitrile, carbon monoxide and carbon dioxide are, respectively, 82%, 3.8% and 5.5%.

REFERENCE EXAMPLE

In the same manner as in Example 1, except that thallium nitrate is not used, a catalyst composition of which the active components correspond to the formula: $P_{0.08}Mo_{12}Fe_1Bi_1Mn_1Mg_1Co_1Ni_{5.5}O_{47.7}$ is prepared.

As in Example 1, a gaseous mixture of propylene, ammonia, oxygen, steam and nitrogen (1.0:1.2:2.8:8.9:6.8 in molar ratio) is contacted with the above-obtained catalyst composition (6 ml.) at 410° C. at a space velocity of 550 hr.$^{-1}$, whereby acrylonitrile is produced. The conversion of propylene is 99.5% and the selectivities to acrylonitrile, carbon monoxide and carbon dioxide are respectively 53%, 13.1% and 10.6%.

What is claimed is:

1. A catalyst composition comprising a catalyst system of the formula: $Tl_aPb_bMo_cFe_dBi_eMn_fX_gO_h$ wherein X is Ni, Mg, Co or mixtures thereof and $a$, $b$, $c$, $d$, $e$, $f$, $g$, and $h$ represent, respectively, the number of atoms and $c$ is 12, $a$ is 2 or less, but not 0; $b$ is 0 to 5; $d$ is 0.1 to 5; $e$ is 0.1 to 5; $f$ is not more than 15 but not 0; $g$ is 0 to 15; $f+g$ is 2 to 15; and $h$ is from 38.3 to 81.5.

2. A catalyst composition according to claim 1, wherein $a$ is 0.01 to 1.0; $b$ is 0.01 to 3.0; $d$ is 0.1 to 5; $e$ is 0.5 to 3.0; $f$ is not more than 12, but not 0; $g$ is 0 to 12; $f+g$ is 2 to 12; and $h$ is from 38.9 to 69.0.

3. A catalyst composition according to claim 1, wherein said catalyst composition is incorporated with a carrier selected from the group consisting of silica, alumina, silicon carbide and titanium oxide.

4. A catalyst composition according to claim 3 wherein the amount of the carrier is less than 90% by weight, of said catalyst composition.

5. A catalyst composition according to claim 3, wherein the amount of the carrier is from 5 to 90% by weight of said catalyst composition.

References Cited

UNITED STATES PATENTS

| | | | |
|---|---|---|---|
| 2,995,528 | 8/1961 | Dowden et al. | 252—464 |
| 3,102,147 | 8/1963 | Johnson | 252—437 X |
| 3,157,688 | 11/1964 | Arnold et al. | 252—437 X |
| 3,254,110 | 5/1966 | Sennewald et al. | 252—437 X |
| 3,576,764 | 4/1971 | Yamaguchi et al. | 252—437 |

PATRICK P. GAVIN, Primary Examiner

U.S. Cl. X.R.

252—443, 455 R, 464; 260—465.3

UNITED STATES PATENT OFFICE
CERTIFICATE OF CORRECTION

Patent No. 3,741,910            Dated June 26, 1973

Inventor(s) Shiraishi, et al

It is certified that error appears in the above-identified patent and that said Letters Patent are hereby corrected as shown below:

Column 1, lines 25 and 26, change "b is 05; e" to --b is 0 to 5; d is 0.1 to 5;e--
    line 44, change "bolybdenum" to --molybdenum--.

Column 2, line 19, change "0.5" to --0 to 5--.

Column 3, line 48, change "Ti" to --Tl--;
    line 51, before "6", insert -- ( --.

Column 4, line 1, change "Ti" to --Tl--;
    line 17, change "Ti" to --Tl--;
    line 34, change "Ti" to --Tl--.

Column 5, line 10, change "T-" to --Tl--.

Column 6, line 1, change "$Tl_e$" to --$Tl_a$--.

Signed and sealed this 16th day of July 1974.

(SEAL)
Attest:

McCOY M. GIBSON, JR.                C. MARSHALL DANN
Attesting Officer                  Commissioner of Patents